(12) United States Patent
Grunin et al.

(10) Patent No.: US 10,904,242 B2
(45) Date of Patent: *Jan. 26, 2021

(54) SYSTEM, METHOD AND COMPUTER PROGRAM PRODUCT FOR GENERATING A COGNITIVE ONE-TIME PASSWORD

(71) Applicant: International Business Machines Corporation, Armonk, NY (US)

(72) Inventors: Galina Grunin, Somers, NY (US); Nader M. Nassar, Somers, NY (US); Tamer M. Nassar, Southbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,242

(22) Filed: Apr. 30, 2019

(65) Prior Publication Data
US 2019/0260736 A1    Aug. 22, 2019

Related U.S. Application Data

(63) Continuation of application No. 15/418,812, filed on Jan. 30, 2017, now Pat. No. 10,389,707.

(51) Int. Cl.
*H04L 29/06* (2006.01)
*H04L 29/08* (2006.01)
*H04W 4/14* (2009.01)

(52) U.S. Cl.
CPC ........ *H04L 63/0838* (2013.01); *H04L 67/306* (2013.01); *H04W 4/14* (2013.01)

(58) Field of Classification Search
CPC .............. H04L 63/0838; H04L 63/083; H04L 63/0815; H04L 63/08; H04L 63/102; G06F 21/31
USPC ......................................................... 726/6
See application file for complete search history.

(56) References Cited

U.S. PATENT DOCUMENTS

| | | | |
|---|---|---|---|
| 9,053,305 B2 | 6/2015 | Joshi et al. | |
| 9,269,354 B2 | 2/2016 | Gandrabur et al. | |
| 9,424,233 B2 | 8/2016 | Barve et al. | |
| 2008/0098464 A1* | 4/2008 | Mizrah | G06F 21/36 726/5 |
| 2009/0241182 A1 | 9/2009 | Jaber et al. | |

(Continued)

OTHER PUBLICATIONS

United States Notice of Allowance dated Apr. 8, 2019, in U.S. Appl. No. 15/418,812.

(Continued)

*Primary Examiner* — Farid Homayounmehr
*Assistant Examiner* — Sanchit K Sarker
(74) *Attorney, Agent, or Firm* — Anthony Curro, Esq.; McGinn IP Law Group, LLC

(57) ABSTRACT

A cognitive one-time password generation method, system, and computer program product, include sending a cognitive one-time password question to a user via a third-party platform and granting access to a secured service when the user inputs into the secured service a cognitive one-time password as a correct answer to the cognitive one-time password question where the user receives the cognitive one-time password question, independently from the secured service via the third-party platform, to formulate the correct answer to input into the secured service.

3 Claims, 4 Drawing Sheets

COGNITIVE ONE-TIME PASSWORD GENERATION METHOD 100

(56) References Cited

U.S. PATENT DOCUMENTS

| | | | |
|---|---|---|---|
| 2011/0162067 A1* | 6/2011 | Shuart | G06F 21/31 |
| | | | 726/19 |
| 2013/0007055 A1 | 1/2013 | Brown et al. | |
| 2014/0196133 A1* | 7/2014 | Shuster | H04L 63/08 |
| | | | 726/7 |
| 2015/0169898 A1 | 6/2015 | Lembcke | |
| 2016/0044021 A1 | 2/2016 | Thibadeau, Sr. et al. | |
| 2016/0170957 A1 | 6/2016 | Allen et al. | |
| 2017/0105666 A1 | 4/2017 | Lee | |
| 2017/0213139 A1 | 7/2017 | Sawant et al. | |
| 2017/0364805 A1 | 12/2017 | Boyer | |
| 2018/0046785 A1* | 2/2018 | Anderson | G06F 21/31 |
| 2018/0219859 A1 | 8/2018 | Grunin et al. | |
| 2018/0253432 A1 | 9/2018 | Abu-Saba et al. | |
| 2018/0308006 A1 | 10/2018 | Atkinson | |

OTHER PUBLICATIONS

United States Office Action dated Jan. 22, 2019, in U.S. Appl. No. 15/418,812.

United States Office Action dated Sep. 18, 2018, in U.S. Appl. No. 15/418,812.

Mel, et al. "The NIST Definition of Cloud Computing", Recommendations of the National Institute of Standards and Technology, Nov. 16, 2015.

\* cited by examiner

COGNITIVE ONE-TIME PASSWORD GENERATION METHOD 100

SYSTEM, METHOD AND COMPUTER PROGRAM PRODUCT FOR GENERATING A COGNITIVE ONE-TIME PASSWORD

CROSS-REFERENCE TO RELATED APPLICATIONS

The present application is a Continuation Application of U.S. patent application Ser. No. 15/418,812, filed on Jan. 30, 2017, the entire contents of which are hereby incorporated by reference.

BACKGROUND

The present invention relates generally to a cognitive one-time password generation method, and more particularly, but not by way of limitation, to a system, method, and computer program product for generating a question to which an answer is a cognitive one-time password (i.e., a three-step password authentication password).

While generating multi-factor authentication passwords is becoming a trend in the identity validation and verification domain, one-time passwords (OTP) are conventionally considered the default solution to provide an extra level of needed security for secured services (i.e., financial institutions, secure servers, etc.).

Conventionally, OTPs are sent as a series of numerical digits varies in length from six to twelve digits that are communicated to the end user in a variety of forms like Short Message Service (SMS), e-mail, or even via voice over a phone.

Many institutions have moved to call-based delivery of passcodes rather than using only SMS delivery. This theoretically provides better security since the passcode sent via text messages could be intercepted by malware on a mobile device.

However, there is a technical problem in the conventional techniques that a text-based alphanumeric OTP could be compromised with certain types of mobile malware that parse the SMS messages and recognize the OTP, which could exploit the end user. Also, there is a burden on the user to enter the OTP into the secured service correctly as this can be difficult with randomly-generated twelve digit codes. Further, the OTP is sent directly to the user such that entering the OTP into the secured service is a two-step process (i.e., receive the OTP and then enter the received OTP).

SUMMARY

In an exemplary embodiment, the present invention can provide a computer-implemented cognitive one-time password generation method, the method includes generating a cognitive one-time password question when a user attempts to login to a secured service, sending the cognitive one-time password question to the user via a third-party platform, and granting access to the secured service when the user inputs into the secured service a cognitive one-time password as a correct answer to the cognitive one-time password question.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
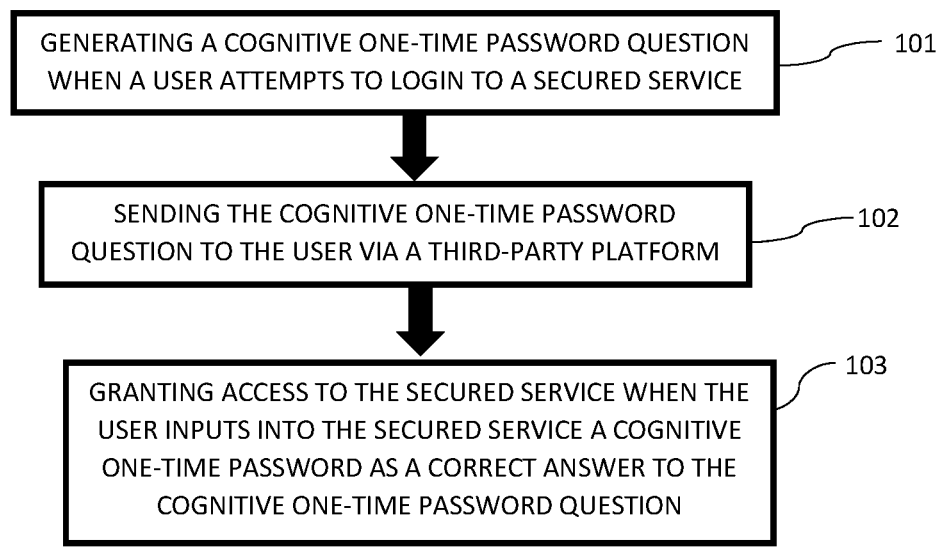
FIG. 1 exemplarily shows a high-level flow chart for a cognitive one-time password (OTP) generation method 100.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the cognitive one-time password generation method 100 includes various steps to generate a question when a user attempts to login to a secured service, to send the question to a third-party platform, and to grant access to the secured service when the user correctly inputs the answer to the question (i.e., a three-step authentication). As shown in at least FIG. 2, one or more computers of a computer system 12 according to an embodiment of the present invention can include a memory 28 having instructions stored in a storage system to perform the steps of FIG. 1.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, a cognitive one-time password (OTP) question is generated when a user attempts to login to a secured service. For example, a user can be attempting to login to their banking institution and enters their credentials (i.e., login information). The question is generated because of the attempted login. The challenge questions are selected from a list of pre-generated challenge questions (e.g., randomly, or based on a random number and a counter). The question has only one correct answer. The answer can be based on, for example, user profile information (e.g., a month of the user's birthdate, the user's hometown, the user's age, etc.), certain common knowledge (e.g., the first name of the current U.S. President, the number of states in the U.S., the color of the sky, etc.), and/or a user's cognitive abilities (e.g., a month following the month of the user's birthdate, the user's birth year minus 1000, a solution to a mathematical problem (i.e, 1+1=?), etc.). That is, the question requires that the user take an additional cognitive step beyond receiving the answer (i.e., the user must derive the answer from the question).

In step 102, the cognitive one-time password question is sent to the user via a third-party platform. The third-party platform can include, for example, a short message service (SMS), e-mail, or any type of communication receivable by the user that is separate from the secured service software. For example, an e-mail with the question can be sent to the user's e-mail address and in turn the user is required to access a different service that the user can presumably access (i.e., an e-mail or the user's mobile device typically requires a password). In other words, the user receives the question via a different mechanism (and preferably separate) than the mechanism utilized to login to the secured service.

In step 103, access to the secured service is granted when the user inputs into the secured service a cognitive one-time password as a correct answer to the cognitive one-time password question. That is, the user receives the question in step 102 and the user cognitively (i.e., "thinks of", "intellectually determines", etc.) determines the answer to the question. If the answer to the question (i.e., the one-time password) is correct, access is granted.

Thus, the access to the secured service is a "three-step" process of receiving a question, cognitively determining the answer, and inputting the cognitively determined answer to the secured service. This approach may relieve the user from a tedious task of re-typing the one-time password that is commonly generated by a token device and may include a long string of alphanumeric symbols. Such can be intercepted by malware. Instead, with the invention, the user is presented with a question and is expected to type in the answer (i.e., "three-step"), instead of just re-typing the password sent to them (i.e., "two-step").

In one exemplary embodiment, a user is trying to log in to his account with multifactor authentication enabled. The user is sent an email with his cognitive one time password being the answer to the generated cognitive one-time password question that is "What is the current year minus your age?" Since the user is 116 years old, the user cognitively determines the answer and then enters 1901 in the cognitive one-time password answer field in the log-in page of the secured service. The secured service validates the answer, and upon successful validation, the user is granted access. Thus, instead of simply receiving the password to enter into the secured service, the user receives a question of which the answer is the password that the user must cognitively determine and then input into the secured service for access.

It is noted that the embodiments described above include a single cognitive one-time password question, but, the invention is not limited thereto. That is, the generating in step 101 can generate multiple questions of which the user must answer each question correct. Such dynamically random generated questions increase security over the retyping of a passive password directly sent to a user. The secured service administrator can modify the number of questions based on a desired level of security.

Further, the cognitive one-time password question is selected from a group that requires a cognitive determination to answer outside of the third-party platform and the secured service (i.e., the user can determine the answer in their mind).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
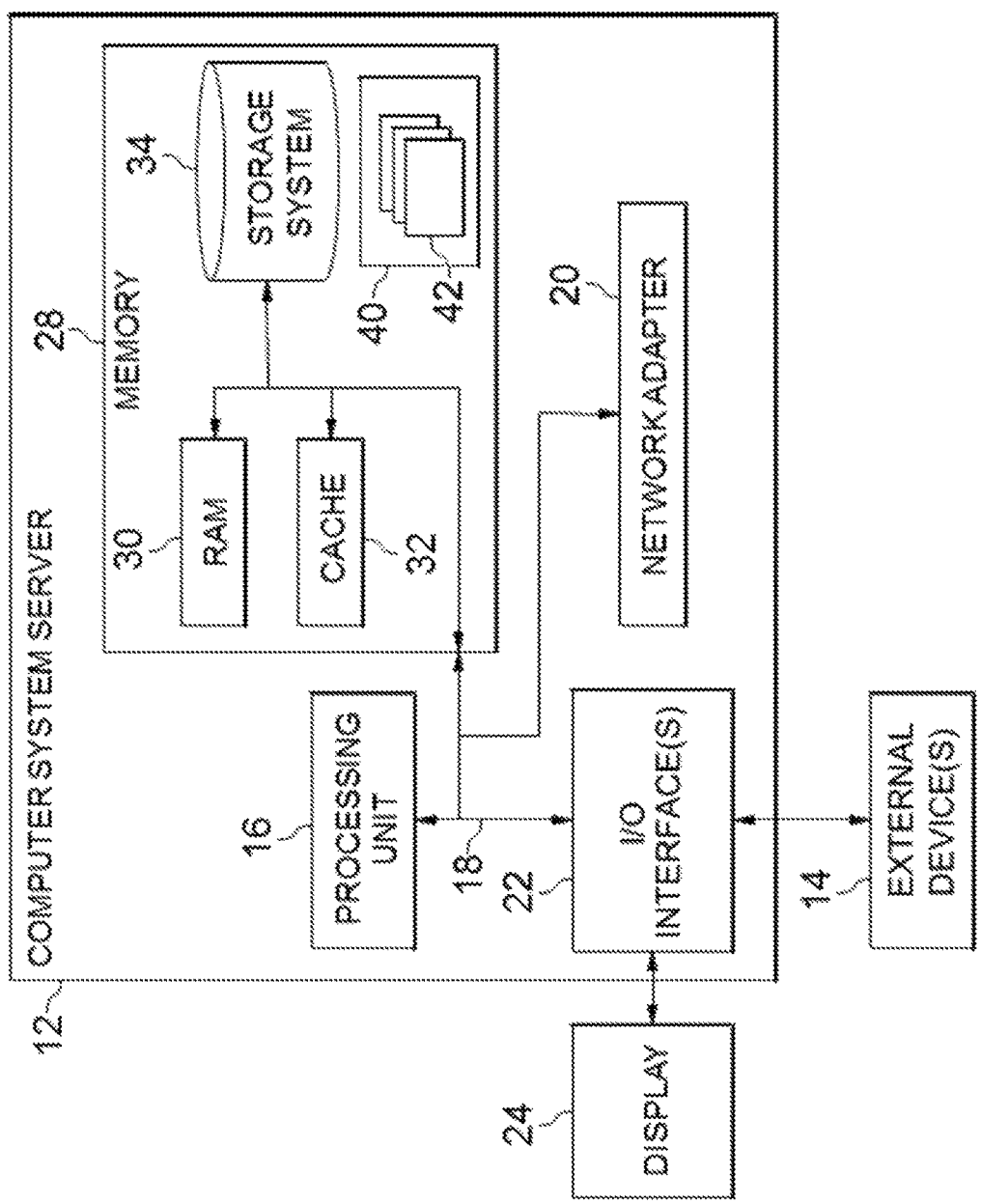
FIG. 2 depicts a cloud computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
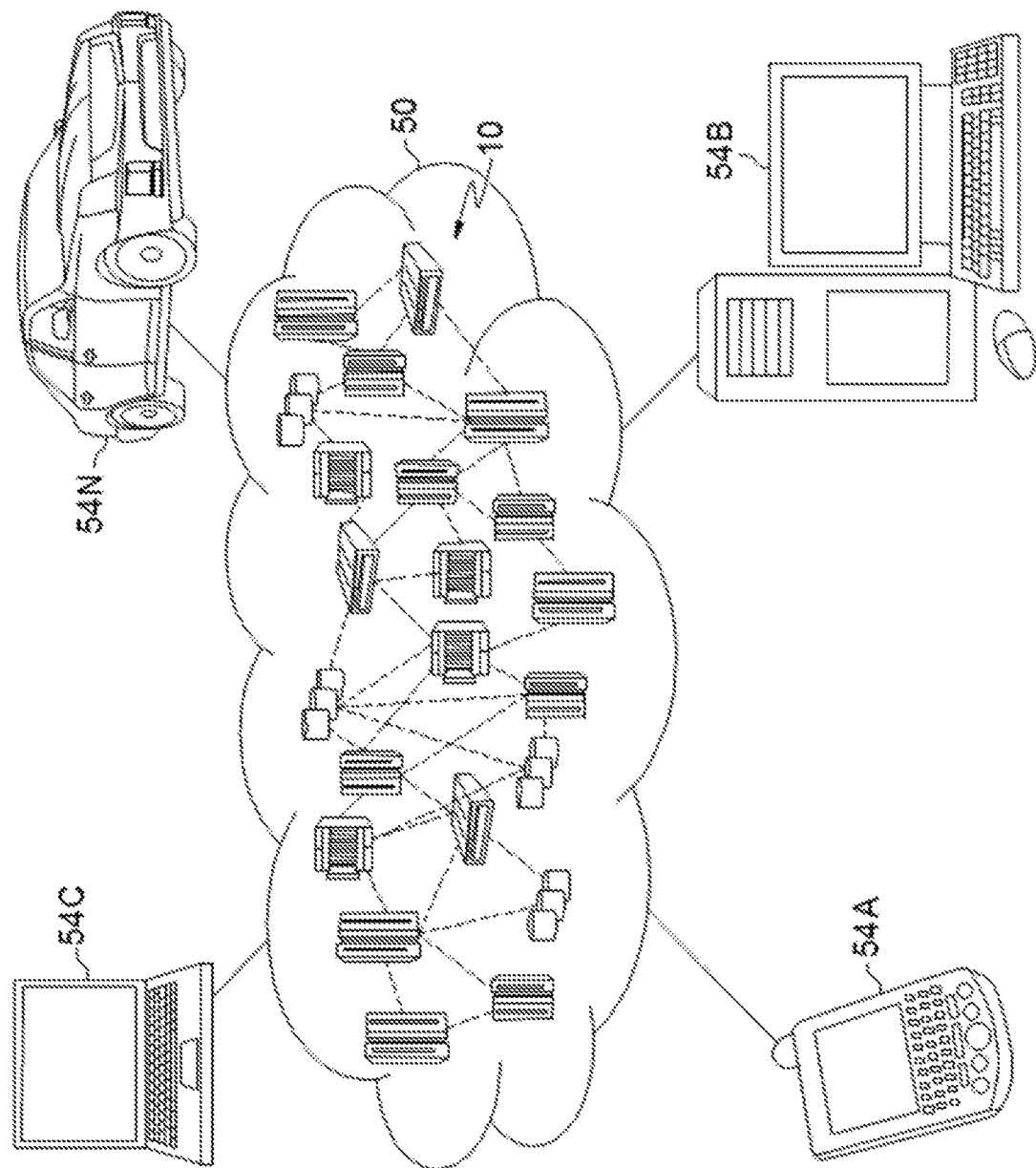
FIG. 3 depicts a cloud computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
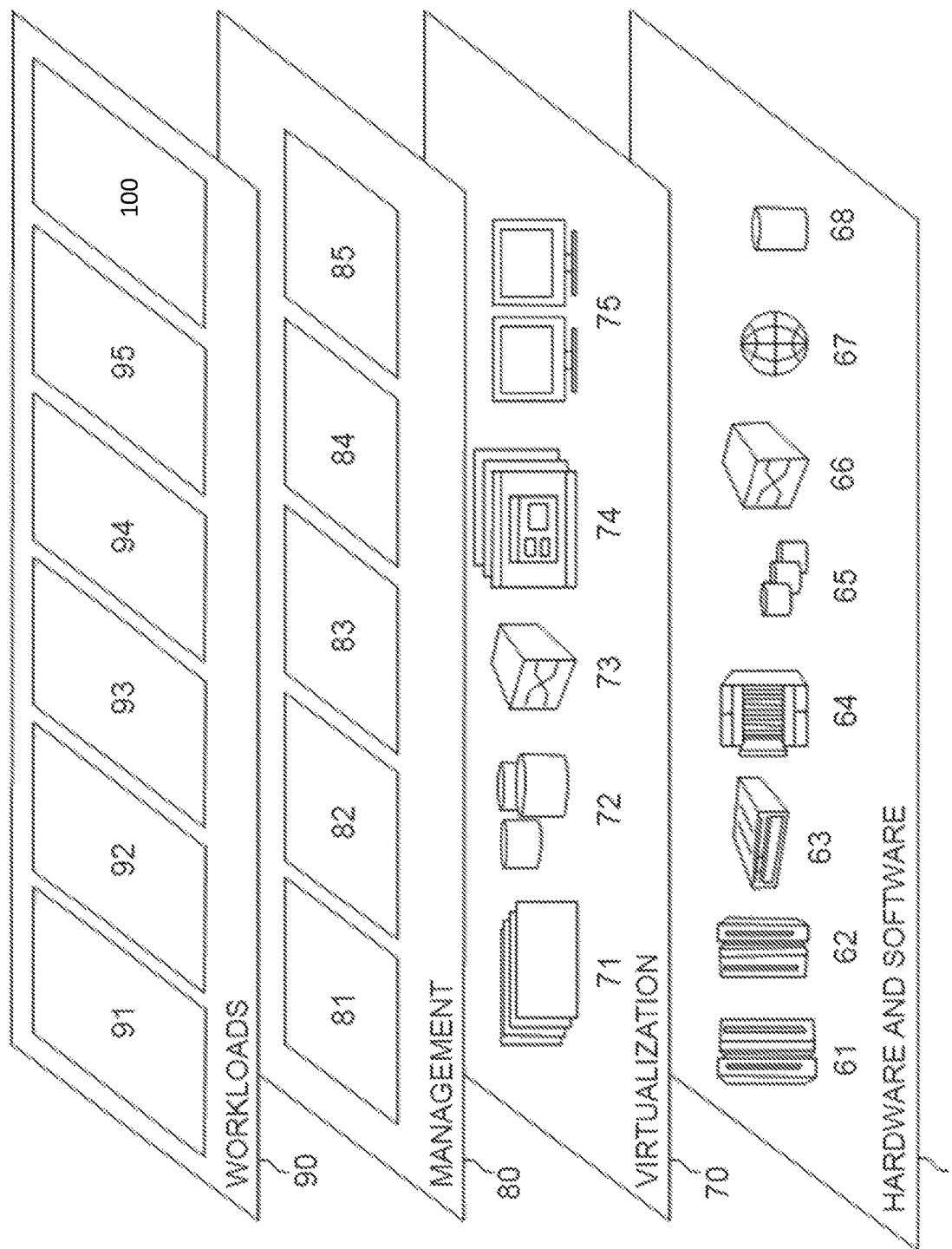
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the cognitive one-time password generation method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented cognitive one-time password generation method, the method comprising:
    sending, via a processor on a computer, from a secured service that requires a response from a user for access to the secured service, a cognitive one-time password question to the user via a third-party platform using a different application for communication than a software that sends the cognitive one-time password question from the secured service; and
    granting, via the processor on the computer, access to the secured service when the user inputs a cognitive one-time password that the user cognitively determines as a correct answer to the cognitive one-time password question that was received by the user in the different application than the secured service,
    wherein the user receives the cognitive one-time password question that is sent via the processor on the computer, independently from the secured service via the third-party platform, to cognitively determine the correct answer for access authorization into the secured service,
    wherein the cognitive one-time password question is randomly selected from a list of pre-generated challenge questions, and
    wherein each of the pre-generated challenge questions includes a single answer.

2. A computer program product for cognitive one-time password generation, the computer program product comprising a non-transitory computer-readable storage medium having program instructions embodied therewith, the program instructions executable by a computer to cause the computer to perform:
    sending, via a processor on a computer, from a secured service that requires a response from a user for access to the secured service, a cognitive one-time password question to the user via a third-party platform using a different application for communication than a software that sends the cognitive one-time password question from the secured service; and
    granting, via the processor on the computer, access to the secured service when the user inputs a cognitive one-time password that the user cognitively determines as a correct answer to the cognitive one-time password question that was received by the user in the different application than the secured service, wherein the user receives the cognitive one-time password question that is sent via the processor on the computer, independently from the secured service via the third-party platform, to cognitively determine the correct answer for access authorization into the secured service, wherein the cognitive one-time password question is randomly selected from a list of pre-generated challenge questions, and wherein each of the pre-generated challenge questions includes a single answer.

3. A cognitive one-time password generation system, said system comprising:

a processor; and a memory, the memory storing instructions to cause the processor to perform:

sending, via the processor on the system, from a secured service that requires a response from a user for access to the secured service, a cognitive one-time password question to the user via a third-party platform using a different application for communication than a software that sends the cognitive one-time password question from the secured service; and granting, via the processor on the computer, access to the secured service when the user inputs a cognitive one-time password that the user cognitively determines as a correct answer to the cognitive one-time password question that was received by the user in the different application than the secured service, wherein the user receives the cognitive one-time password question that is sent via the processor on the system, independently from the secured service via the third-party platform, to cognitively determine the correct answer for access authorization into the secured service, wherein the cognitive one-time password question is randomly selected from a list of pre-generated challenge questions, and wherein each of the pre-generated challenge questions includes a single answer.

\* \* \* \* \*